United States Patent
Ting et al.

(10) Patent No.: US 10,274,907 B2
(45) Date of Patent: Apr. 30, 2019

(54) SYSTEM AND METHOD FOR PREVENTING TOTAL PLANT SHUTDOWN DUE TO LOW TEMPERATURE EXCURSION

(71) Applicant: WPT LLC, Houston, TX (US)

(72) Inventors: Tiong-Ee Ting, Houston, TX (US); Kenneth M. Istre, Sulphur, LA (US); Newton Landreneau, Moss Bluff, LA (US); W. Ryan Pitt, Lakes Charles, LA (US); Gregory M. Guillory, Jr., Lakes Charles, LA (US); Charles R. Demarest, Lakes Charles, LA (US); Toby Darbonne, Sulphur, LA (US); Troy L. Irwin, Iowa, LA (US)

(73) Assignee: WPT LLC, Houston, TX (US)

( * ) Notice: Subject to any disclaimer, the term of this patent is extended or adjusted under 35 U.S.C. 154(b) by 812 days.

(21) Appl. No.: 14/065,049

(22) Filed: Oct. 28, 2013

(65) Prior Publication Data

US 2015/0120066 A1 Apr. 30, 2015

(51) Int. Cl.

| | | |
|---|---|---|
| *G05B 15/02* | (2006.01) | |
| *F25J 3/04* | (2006.01) | |
| *F25J 3/02* | (2006.01) | |
| *C09K 5/04* | (2006.01) | |
| *C10G 9/14* | (2006.01) | |

(Continued)

(52) U.S. Cl.
CPC ............ *G05B 15/02* (2013.01); *C09K 5/042* (2013.01); *C10G 9/14* (2013.01); *C10G 11/00* (2013.01); *C10G 11/18* (2013.01); *F25J 3/0209* (2013.01); *F25J 3/0219* (2013.01); *F25J 3/0233* (2013.01); *F25J 3/0238* (2013.01); *F25J 3/0242* (2013.01); *F25J 3/04787* (2013.01); *F25J 3/04854* (2013.01); *C10G 2300/4006* (2013.01); *C10G 2400/20* (2013.01); *F25J 2210/12* (2013.01); *F25J 2215/62* (2013.01); *F25J 2280/02* (2013.01); *F25J 2290/90* (2013.01)

(58) Field of Classification Search
CPC ...... F25J 1/0256; F25J 1/0298; F25J 3/04854; F25J 2290/90
See application file for complete search history.

(56) References Cited

U.S. PATENT DOCUMENTS

| | | |
|---|---|---|
| 3,997,109 A | 12/1976 | Hays |
| 4,064,392 A | 12/1977 | Desalu |
| 4,233,817 A | 11/1980 | Toth |

(Continued)

FOREIGN PATENT DOCUMENTS

| | | |
|---|---|---|
| CN | 202420113 | 9/2012 |

*Primary Examiner* — Tareq Alosh
(74) *Attorney, Agent, or Firm* — Schultz & Associates, P.C.

(57) ABSTRACT

A system of interlocks for controlling flow of low temperature process streams in a manufacturing process through a cold box to equipment not specified for such temperatures by opening and closing valves and stopping pumps. At least one interlock affects streams heated in the cold box. At least one interlock affects the streams cooled in the cold box. The interlocks are activated due to temperature determinations of process lines by temperature sensors and automatically send a signal to predetermined controllers depending on the process line with the low temperature in order to prevent exposure of equipment to low temperatures while preventing the shutdown of the cold box.

18 Claims, 6 Drawing Sheets

(51) Int. Cl.
*C10G 11/00* (2006.01)
*C10G 11/18* (2006.01)

(56) References Cited

U.S. PATENT DOCUMENTS

| | | | |
|---|---|---|---|
| 4,313,310 A | | 2/1982 | Kobayashi et al. |
| 4,488,239 A | | 12/1984 | Agarwal |
| 4,547,977 A | | 10/1985 | Tenedini et al. |
| 4,742,131 A | * | 5/1988 | Asanuma ............ B01J 19/0013 |
| | | | 422/109 |
| 4,744,408 A | | 5/1988 | Pearson et al. |
| 5,014,910 A | | 5/1991 | Koch et al. |
| 5,152,966 A | | 10/1992 | Roe et al. |
| 6,165,418 A | | 12/2000 | Anderson et al. |
| 6,235,852 B1 | | 5/2001 | Hess et al. |
| 6,252,016 B1 | | 6/2001 | Wu et al. |
| 6,293,514 B1 | | 9/2001 | Pechoux et al. |
| 6,487,876 B2 | | 12/2002 | Howard et al. |
| 6,938,433 B2 | | 9/2005 | Bash et al. |
| 7,775,268 B2 | | 8/2010 | Sato et al. |
| 8,406,928 B2 | | 3/2013 | Gupta et al. |
| 2003/0225466 A1 | | 12/2003 | Yulevitch et al. |
| 2005/0072174 A1 | | 4/2005 | Beers |
| 2006/0074599 A1 | | 4/2006 | Emigholz et al. |
| 2009/0062495 A1 | | 3/2009 | Cheluget et al. |
| 2010/0262301 A1 | | 10/2010 | Schwartz et al. |

\* cited by examiner

SYSTEM AND METHOD FOR PREVENTING TOTAL PLANT SHUTDOWN DUE TO LOW TEMPERATURE EXCURSION

FIELD OF THE DISCLOSURE

The present disclosure relates to a system and method to prevent shutdown of manufacturing processes due to abnormal low temperatures encountered in a refrigeration system by the use of safety interlocks.

BACKGROUND

Ethylene is a colorless flammable gas with a formula of $C_2H_4$. Ethylene is a basic chemical that is used widely for production of ethylene derivative chemicals. Major industrial reactions using ethylene include polymerization, oxidation, halogenation and hydro halogenation, alkylation, hydration, oligomerization and hydroformylation.

Ethylene is produced in the petrochemical industries from various types of feedstocks such as ethane, propane, ethane-propane mix, butane, naphtha, etc. through the process of steam cracking or in the oil refineries by cracking over zeolite catalysts. Typical process design in the production of ethylene includes feed treating, steam cracking, heat recovery, acid gas treatment, cracked gas compression, cold fractionation and hot fractionation.

In the cold fractionation process, due to the extremely cold temperatures, aluminum heat exchangers are usually used because of the compatibility of their metallurgy with various other interconnected parts of the system. In addition, aluminum heat exchangers are effective in lowering overall equipment count and capital investment required for an ethylene manufacturing plant.

In general, the aluminum heat exchangers are used to transfer heat between multiple streams in a "cold box." Heat exchangers can be used alone or in combination in the same cold box. Usually, the "hot streams" connected to the aluminum heat exchangers come from various levels of refrigeration and transfer heat to "cold streams" from cold service process equipment.

While operating, temperatures across an aluminum heat exchanger can range from −350 F to 160 F, depending on the plant design. Such a great temperature range induces tremendous thermal stresses. The thermal stresses often lead to premature aging of the aluminum heat exchanger and fracture failure.

In order to overcome the problem of failure, the prior art has responded by reinforcing the mechanical design of the aluminum heat exchangers. However, despite design improvements, the process piping and equipment connecting to the outlet streams of the aluminum heat exchangers are often made of interior materials, such as ductile iron. Inferior materials are not a problem so long as the system operates in normal temperature ranges. However, the inferior materials can lead to catastrophic failure when exposed to extremely low temperatures, which sometimes result from abnormal plant operating conditions. Such catastrophic failure results in plant shut down and can result in injury to plant personnel. Superior materials for process piping, such as stainless steel, are available which can operate safely across larger temperature ranges, such as below −20 F, but they are extremely expensive and difficult to fabricate.

Examples of manufacturing processes which involve low temperatures are found in the prior art but they do not solve the problems inherent in abnormally low process temperatures. U.S. Pat. No. 5,361,589 to Howard, et al. discloses an ethylene recovery system with cracked gas cooled to about −20 to −40 F. However, Howard does not disclose how to control temperatures to protect process piping and equipment during abnormal operating conditions where lower temperatures are experienced.

U.S. Pat. No. 5,979,177 to Summer, et al. discloses an ethylene plant refrigeration system where the gas feed is cooled to about −31 to −35 F. However, Summer does not disclose how to monitor stream temperatures and control temperatures to protect process piping and equipment during abnormal low temperature conditions.

U.S. Pat. No. 4,900,347 to McCue, et al. discloses a method for recovering ethane or ethylene from cracking gas requiring low temperature refrigeration. At least one portion of the disclosed method has process temperatures below −20 F. However, McCue does not disclose how temperatures of process streams are monitored or modified in response to abnormal low temperature conditions.

Other prior art demonstrates methods to monitor and control process temperatures. However, none of the methods have been entirely satisfactory in controlling abnormal low process temperatures while protecting process piping and equipment.

U.S. Pat. No. 4,488,239 to Agarwal discloses a system to control temperatures in an olefin oxidation reactor by incrementally adjusting the flow rate of coolant to the chemical reactor based on measured temperatures. However, Agarwal does not disclose control of streams based on abnormally low process temperatures around the reactor to protect process lines and equipment.

United States Patent Publication No. 2010-026301 filed by Schwartz, et al. discloses a method for controlling a process flow rate through an aluminum heat exchanger by adjusting a bypass. However, Schwartz does not disclose the use of redirection or flow stoppages.

SUMMARY

Aluminum heat exchangers are often used in an ethylene processing plant for transferring heat between multiple process streams. Such aluminum heat exchangers can be operated in a single unit or in multiple units arranged in series or in parallel. Arrangement of the process streams in an aluminum heat exchanger is done so as to prevent a large temperature differential. A high temperature differential can stress the mechanical integrity of the aluminum heat exchanger, leading to fatigue and failure.

Advancement in the technology has improved the design of the aluminum heat exchangers. But, such improvements fail to compensate for the impact of cold process liquid leaving the aluminum heat exchanger during transient operating conditions and the resulting impact on downstream equipment. Downstream equipment is often is constructed of carbon steel materials. Carbon steel is not compatible with extremely cold temperatures and when exposed to them becomes dangerously brittle.

In order to protect process piping and downstream equipment from abnormally low process temperatures while preventing process shutdown, a method and system is disclosed which provides for monitoring and controlling the temperatures of various streams based on a set of predetermined high and low temperatures. Temperature sensors are connected through controllers to valves on the heating and cooling streams. The sensors, controllers and valves are known as "interlocks." When abnormal process temperatures occur, the interlocks open or close in order to redirect, stop or bypass certain streams. Controllers are also provided for pumps, which, in response to abnormal temperatures, increase or reduce flow to specific pieces of equipment. Location of the interlocks and pumps in the system and careful control of their functions prevent a shutdown of flow through the cold box and allow the system to continue operating until the temperatures reach normal conditions. Hence, damage to the aluminum heat exchangers and downstream piping is avoided while also avoiding expensive system shutdown.

The disclosure includes multiple temperature sensors located at different locations in the process, such as when the heating and cooling streams leave the cold box. Further, temperature sensors can be connected to multiple valves and pump controllers such that multiple actions can occur based on a single temperature reading.

It should be understood that the invention is not limited to use in ethane and propane streams in an ethylene process. Other processes which can benefit from the invention include air separation, extraction of natural gas liquids, and other cryogenic processes.

BRIEF DESCRIPTION OF THE DRAWINGS

In the detailed description of the preferred embodiments presented below, reference is made to the accompanying drawings.

DETAILED DESCRIPTION OF THE PREFERRED EMBODIMENT

In the description that follows, like parts are marked throughout the specification and figures with the same numerals, respectively. The figures are not necessarily drawn to scale and may be shown in exaggerated or generalized form in the interest of clarity and conciseness.

Figure 1:
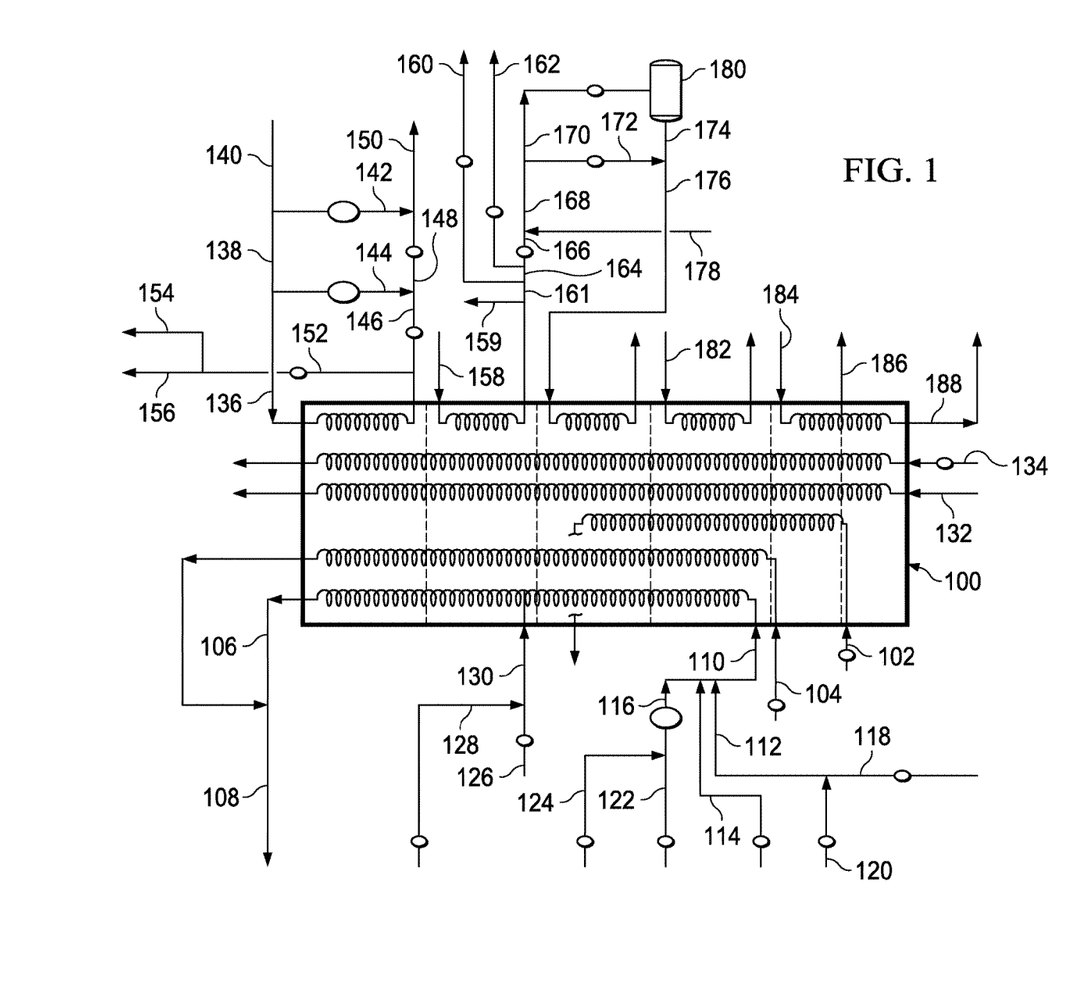
FIG. 1 is a flow sheet of an embodiment of a cold box process.

FIG. 1 is a flow sheet for an embodiment of a cold box 100 used in an ethylene production process. Some of the streams flowing through cold box 100 are heated and some are cooled. Unless indicated otherwise, the following descriptions and conditions of the streams through cold box 100 are described at steady state conditions.

Stream 102 is from the bottom of a demethanizer. As stream 102 flows through cold box 100 it is heated. The stream enters cold box 100 in a liquid form, at about −67 F, and exits cold box 100 in a liquid form, at about 14 F. In the present embodiment, the stream then proceeds to another aluminum heat exchanger before going to a deethanizer.

Stream 104 is a liquid vapor ethane mixture feed. It enters cold box 100 at about −45 F and is heated as it flows through cold box 100. The stream leaves cold box 100 and is combined with stream 106 to form stream 108. Stream 108 has a temperature of about 89 F and is a vapor. Stream 108 proceeds to another aluminum heat exchanger before entering to the furnaces to be used as feed source.

Stream 110 is a combination of streams 112, 114, and 116 which is heated as it flows through cold box 100. Stream 112 is a combination of streams 118 and 120. Stream 118 is vapor ethane from a feed splitter reflux drum. Stream 120 is liquid ethane from feed dryers. Stream 112 consists of vaporized ethane with a temperature of about −27 F.

Stream 116 is a combination of streams 122 and 124. Stream 122 and stream 124 contain liquid ethane which is fully vaporized through an aluminum heat exchanger before combining with streams 114 and 112 to form stream 110. Stream 122 comes from ethylene splitter. Stream 116 is a mixed vapor/liquid ethane composition having a temperature of about −47 F. Stream 114 is vaporized ethane that comes from a deethanizer overhead and acetylene converter.

Stream 130 joins with stream 110 as stream 110 flows through cold box 100 and is heated. Stream 130 is a combination of streams 126 and 128. Stream 126 consists of a mixture of liquid and vapor propane from the liquid propane recycle from propylene splitter bottom having a temperature of about 54 F. Stream 128 consists of liquid/vapor mixture of propane from a feed splitter bottom having a temperature of about 55 F.

Streams 110 and 130 combine into stream 106, which joins stream 104 to form stream 108.

Stream 132 flows through cold box 100 and is heated. Stream 132 contains hydrogen offgas going to a methanator. Stream 132 enters cold box 100 as a vapor having a temperature of about −103 F and exits cold box 100 with a temperature of about 95 F.

Stream 134 flows through cold box 100 and is heated. Stream 134 contains methane which is to be used as fuel gas. The methane in stream 134 enters cold box 100 as a vapor at approximately −103 F and exits with a temperature of about 95 F.

The heating source for cold box 100 is provided by a four stage propylene refrigeration system and the third stage of a three stage ethylene refrigeration system.

Stream 140 contains liquid propylene having a temperature of about 100 F. Stream 140 splits into stream 138 and stream 142. Stream 142 flows through an aluminum heat exchanger and joins stream 148 to form stream 150. Stream 138 splits into stream 136 and stream 144. Stream 144 flows through an aluminum heat exchanger and joins stream 146 to form stream 148. Stream 150 flows to a tank before continuing to the third stage of the propylene refrigeration system.

Stream 136 flows through cold box 100 as part of the fourth stage of the propylene refrigeration system and is cooled. Stream 136 is liquid propylene having a temperature of about 100 F when it enters cold box 100. Stream 136 leaves cold box 100 with a temperature of about 69 F. After leaving cold box 100, stream 136 splits into streams 152 and 146. Stream 152 further splits into streams 154 and 156. Streams 154 and 156 flows into two separate aluminum heat exchangers, respectively.

Stream 158 flows from a tank between the fourth stage and the third stage of the propylene refrigeration system and contains liquid propylene having a temperature of about 64 F. Stream 158 flows through cold box 100 and is cooled to a temperature of about 44 F as part of the third stage of the propylene refrigeration system. After cooled, stream 158 splits into streams 159 and 161. Stream 159 flows to a liquid drain system. Stream 161 splints into streams 160 and 164. Stream 160 flows to multiple aluminum heat exchangers. Stream 164 splits into streams 162 and 166. Stream 162 flows to an aluminum heat exchanger.

Stream 166 is joined by stream 178 to form stream 168. Stream 178 is propylene coming from other aluminum heat exchangers.

Stream 168 splits into streams 170 and 172. Stream 170 flows to tank 180. Stream 172 is a bypass of tank 180 and can be closed under normal operating conditions. Stream 172 will flow and bypass tank 180 as part of one of the interlocks disclosed later.

Stream 174 flows from tank 180 and joins with stream 172 to form stream 176. Stream 176 is liquid propylene having a temperature of about 25 F. Stream 176 flows through cold box 100 as part of the second stage of the propylene refrigeration system and is cooled. The exit temperature of stream 176 is about −2 F.

Stream 182 contains liquid propylene with a temperature of about 0 F. Stream 182 flows through cold box 100 as part of the first stage of the propylene refrigeration system and exits cold box 100 with a temperature of about −38 F.

Stream 184 contains liquid ethylene with a temperature of about 2 F and is part of the third stage of the ethylene refrigeration system. Stream 184 flows into cold box 100 and splits into streams 186 and 188 before exiting cold box 100. Stream 186 exits cold box 100 prior to stream 188 with a temperature of about −62 F. Stream 188 flows through cold box 100 and exits with a temperature of about −87 F.

Figure 2:
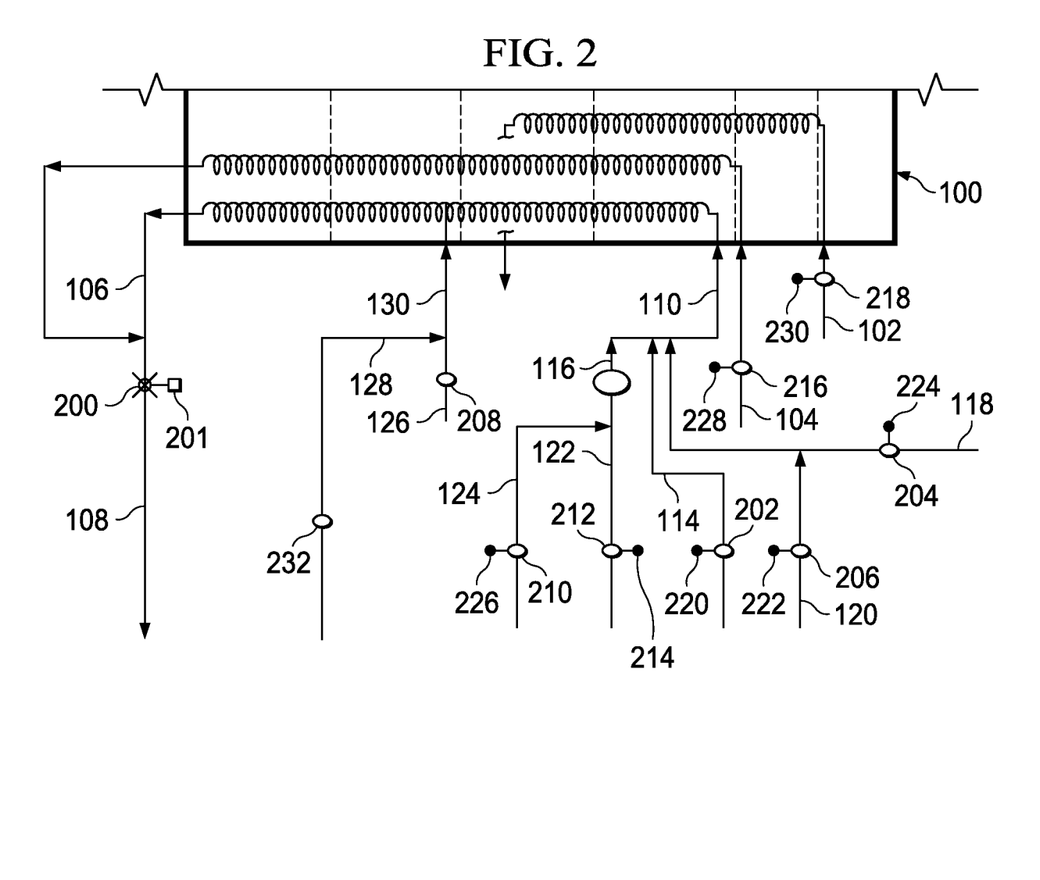
FIG. 2 is a flow sheet for an embodiment of an interlock.

FIG. 2 is a flow sheet for a preferred embodiment of the interlock system on the ethane and propane streams heated in cold box 100. This interlock is design to prevent a complete loss of feedstock to the downstream furnaces in the event of cold fractionation, ethylene refrigeration and or propylene refrigeration system upsets resulting in a low temperature excursion of the feed system.

The piping for stream 128 further includes valve 232 and the piping for stream 126 includes valve 208.

The piping for stream 124 includes valve 210. Valve 210 is connected to valve controller 226. Valve controllers in this embodiment consists of a valve actuation system connected to a trip solenoid. In the preferred embodiment, the valve activation system is available from HYTORK of Netherlands. In a preferred embodiment, the temperature sensor is a Smart Sanitary Temperature type available from Smart Sensors, Inc. of Houston, Tex. The piping for stream 122 includes valve 212 connected to valve controller 214. The piping for stream 114 includes valve 202 connected to valve controller 220. The piping for stream 120 includes valve 206 connected to valve controller 222. The piping for stream 118 includes valve 204 connected to valve controller 224.

The piping for stream 104 includes valve 216 connected to valve controller 228. Valve 216 is located on the piping before stream 104 flows into cold box 100.

The piping for stream 102 includes pump 218 which is connected to pump controller 230.

The piping for stream 108 includes temperature sensor 200. In a preferred embodiment, the temperature sensor is a Smart Sanitary Temperature type available from Smart Sensors, Inc. of Houston, Tex. Temperature sensor 200 determines the temperature of stream 108 after it has left cold box 100. Temperature sensor 200 includes three separate sensors, each of which are determining the temperature of the stream 108 independently. A greater or lesser number of sensors may be used. Multiple sensors have the advantage of providing redundancy in the event of a failure or malfunction of one sensor. Temperature sensor 200 is connected to interlock 201. The connection allows the temperature readings from temperature sensor 200 to be received by interlock 201.

Interlock 201 is connected to valve controllers 226, 214, 220, 222, 224, and 228 and pump controller 230. The connection can be an electrical wire, a data communication line, or a remote communication. The connection allows a signal to be sent from interlock 201 to valve controllers 226, 214, 220, 222, 224, and 228 and pump controller 230 which can react to the signal. The signal can include but is not limited to the cessation of the flow of electricity or power.

In the event that the temperature of stream 108 is determined to about −18 F or below by two of three sensors of temperature sensor 200, then interlock 201 automatically sends a signal to pre-determined valve and pump controllers in order to stop the flow of certain streams while allowing other streams to continue to flow thereby raising the temperature in stream 108 such that equipment downstream of stream 108 is not exposed to temperatures below about −18 F.

Specifically, in the preferred embodiment, when a temperature reading of about −18 F or below is read by temperature sensor 200, interlock 201 sends a signal to valve controllers 226, 214, 220, 222, 224, and 228 to close valves 210, 212, 202, 206, 204 and 216. The interlock further sends a signal to pump controller 230 to stop operation of pump 218. The closing of these valves will stop the flow of streams 124, 122, 114, 120, 118, 110, and 104 and the stopping of pump 218 will stop the flow of stream 102 through cold box 100. However, valves 224 and 208 will remain open allowing stream 130 to flow into cold box 100. Stream 130 has a temperature of about 54 F when it enters cold box 100 and is higher than the streams which are stopped. This allows the temperature within cold box 100 to rise and elevate temperature of stream 108 above the about −18 F threshold, thereby protecting the equipment downstream while still allowing the process to continue.

Figure 3:
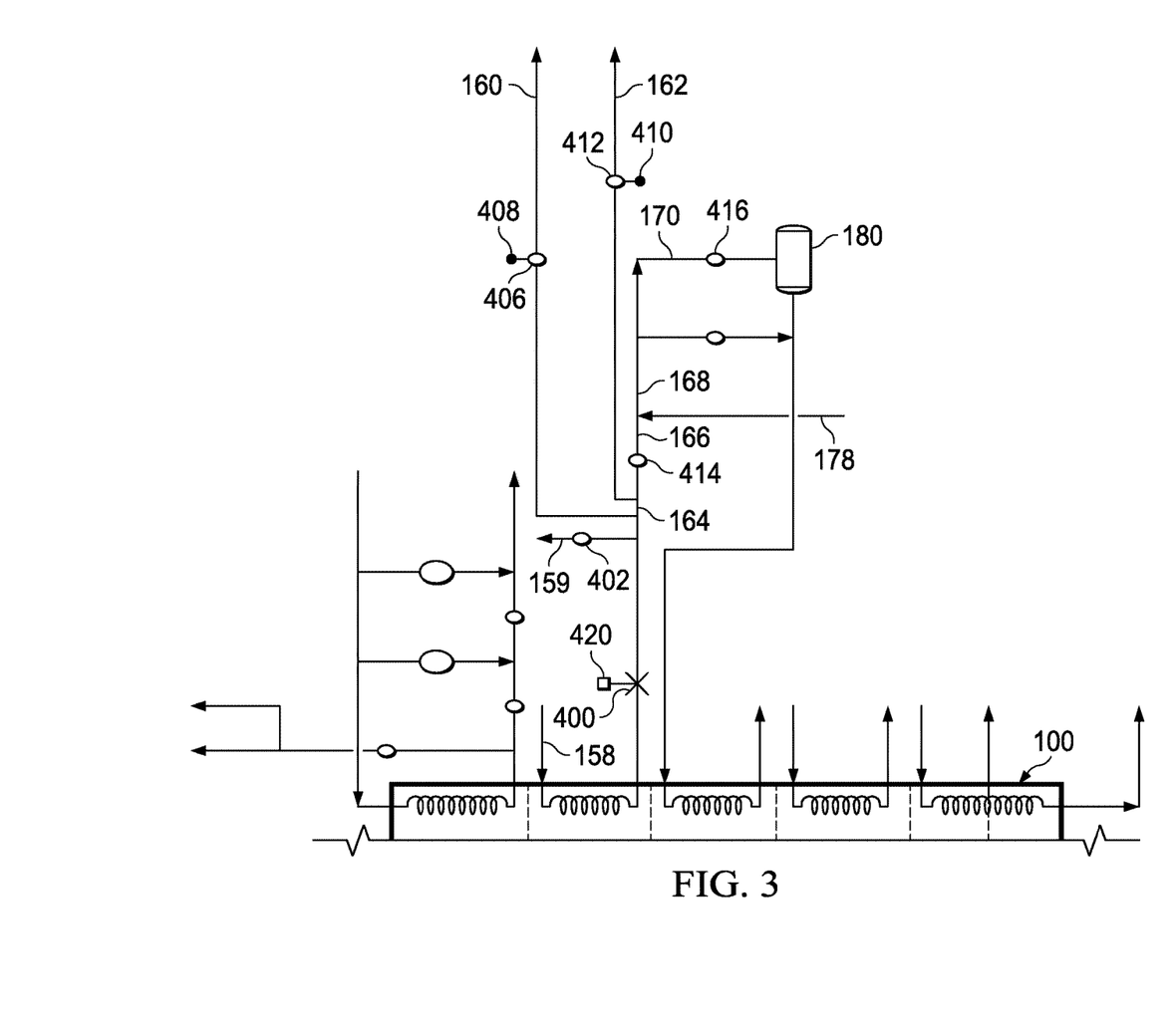
FIG. 3 is a flow sheet for an embodiment of an interlock.

FIG. 3 is a flow sheet for an interlock system on a propylene refrigeration system which, in this embodiment, cools the propylene in cold box 100. This interlock is designed to prevent the propylene refrigeration system from complete shut down due to low temperature excursion on the $3^{rd}$ stage liquid propylene heat exchangers.

Piping for stream 159 includes liquid drain valve 402. The liquid drain valve is used to drain trapped liquid propylene inside the pipe pocket. During normal operating conditions, stream 159 is closed. Stream 159 piping is made up of stainless steel material, which the pipe's temperature rating is sufficient down to −350 F.

Piping for stream 160 includes valve 406 which is connected to valve controller 408. Piping for stream 162 includes valve 412 which is connected to valve controller 410. Piping for stream 166 includes valve 414. Piping for stream 170 includes valve 416.

Piping for stream 158 includes temperature sensor 400. Temperature sensor 400 reads the temperature of the propylene in stream 158 after it exits cold box 100. Temperature sensor 400 includes three separate sensors, each of which are determining the temperature of the stream 158, independently. Temperature sensor 400 is connected to interlock 420. The connection allows the temperature readings from temperature sensor 400 to be received by interlock 420.

Interlock 420 is connected to valve controllers 408 and 410. The connection can be an electrical wire, a data communication line, or a remote communication. The connection allows a signal to be sent from interlock 420 to valve controllers 408 and 410 which are able to react to the signal. The signal can include but is not limited to the cessation of the flow of electricity or power.

In the event that temperature sensor 400 transmits a temperature reading of about −18 F or below by at least two of the three sensors in temperature sensor 400, interlock 420 sends a signal to valve controller 408 and 410 to close valves 406 and 412. The closing of valves 406 and 412 prevents the cold propylene liquid with a temperature of about −18 F or less from reaching the aluminum heat exchangers located downstream. Tripping the aluminum heat exchangers will not completely stop the continuous circulation of propylene in the refrigeration system.

Valves 414 and 416 stay open and stream 164 is allowed to continue to flow and joins with warmer propylene from stream 178. The addition of warmer propylene from stream 178 allows the temperature of the propylene in stream 168 to be elevated above −18 F. Stream 168 is allowed to continue through to tank 180 and proceed through the system preventing a complete system shut down.

Figure 4:
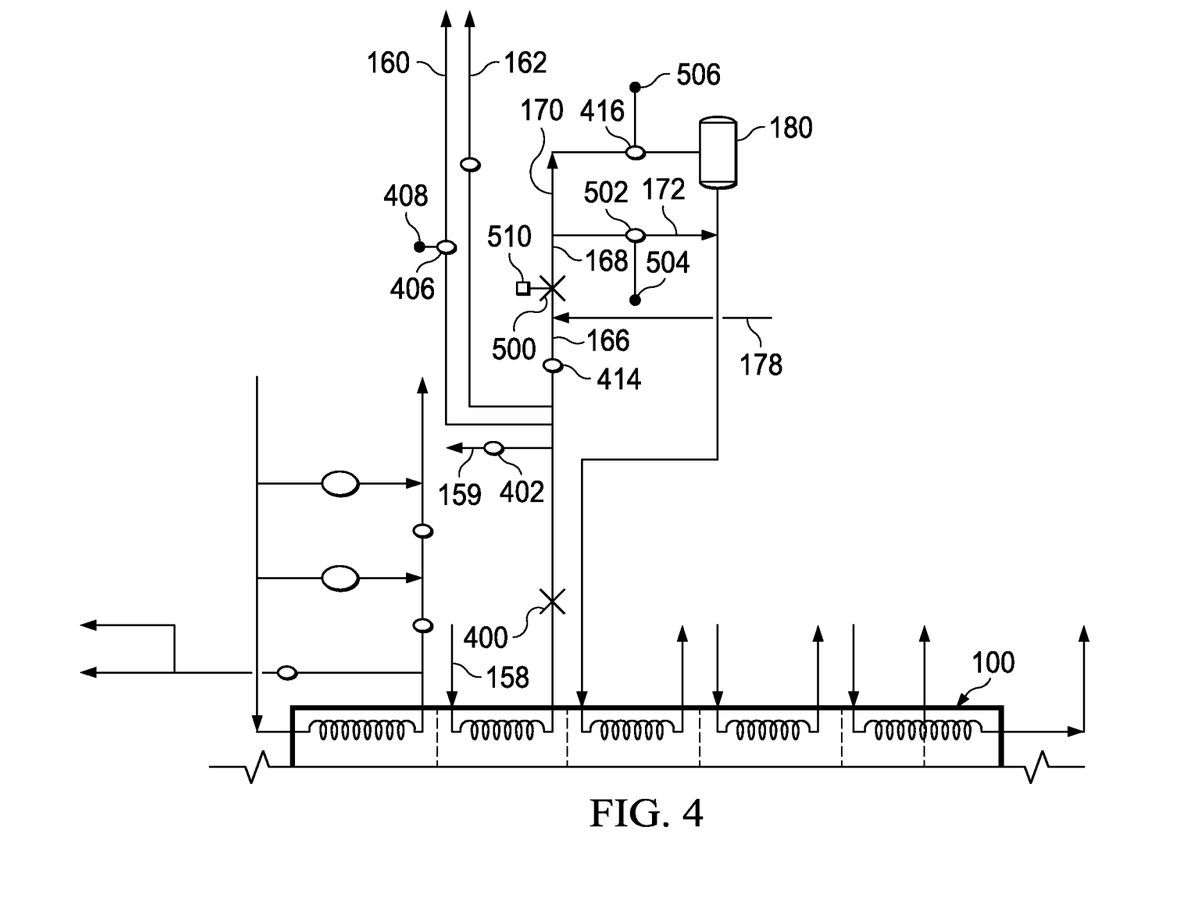
FIG. 4 is a flow sheet for an embodiment of an interlock.

FIG. 4 is a flow sheet for an interlock system on the third stage of a propylene refrigeration system that cools the propylene flowing through cold box 100. This interlock is designed to protect the tank 180 from sensing cold liquid propylene temperature below −18 F by automatically bypassing it.

Valve 416 is connected to valve controller 506. The piping for stream 172 includes valve 502 which is connected to valve controller 504 and is constructed of stainless steel material with low temperature rating of −50 F.

Piping for stream 168 includes temperature sensor 500. Temperature sensor 500 determines the temperature of stream 168. Temperature sensor 500 includes three separate sensors, each of which are determining the temperature of the stream 168 independently. Temperature sensor 500 is connected to interlock 510. The connection allows the temperature readings from temperature sensor 500 to be received by interlock 510.

Interlock 510 is connected to valve controllers 504 and 506. The connection can be an electrical wire, a data communication line, or a remote communication. The connection allows a signal to be sent from interlock 510 to valve controllers 504 and 506 which are able to react to the signal. The signal can include but is not limited to the cessation of the flow of electricity or power.

If the temperature of stream 168 is determined to be about −18 F or below by at least two of the three sensors in temperature sensor 500, interlock 510 sends a signal to valve controller 506 to close valve 416 and to valve controller 504 to open valve 502 allowing the propylene to bypass tank 180 and continue through the process. The bypass of tank 180 allows the propylene to continue to flow through the process while preventing exposure of tank 180 to temperatures about or below −18 F.

A temperature reading of −18 F by temperature sensor 500 is most likely to occur when a temperature reading of about −18 F or below has been registered by temperature sensor 400 and the addition of warmer propylene from stream 178 is insufficient to raise the temperature of the propylene above about −18 F.

Interlock 510 will often not be triggered unless interlock 420 has previously been triggered. However, interlock 510 is completely independent of interlock 420.

Figure 5:
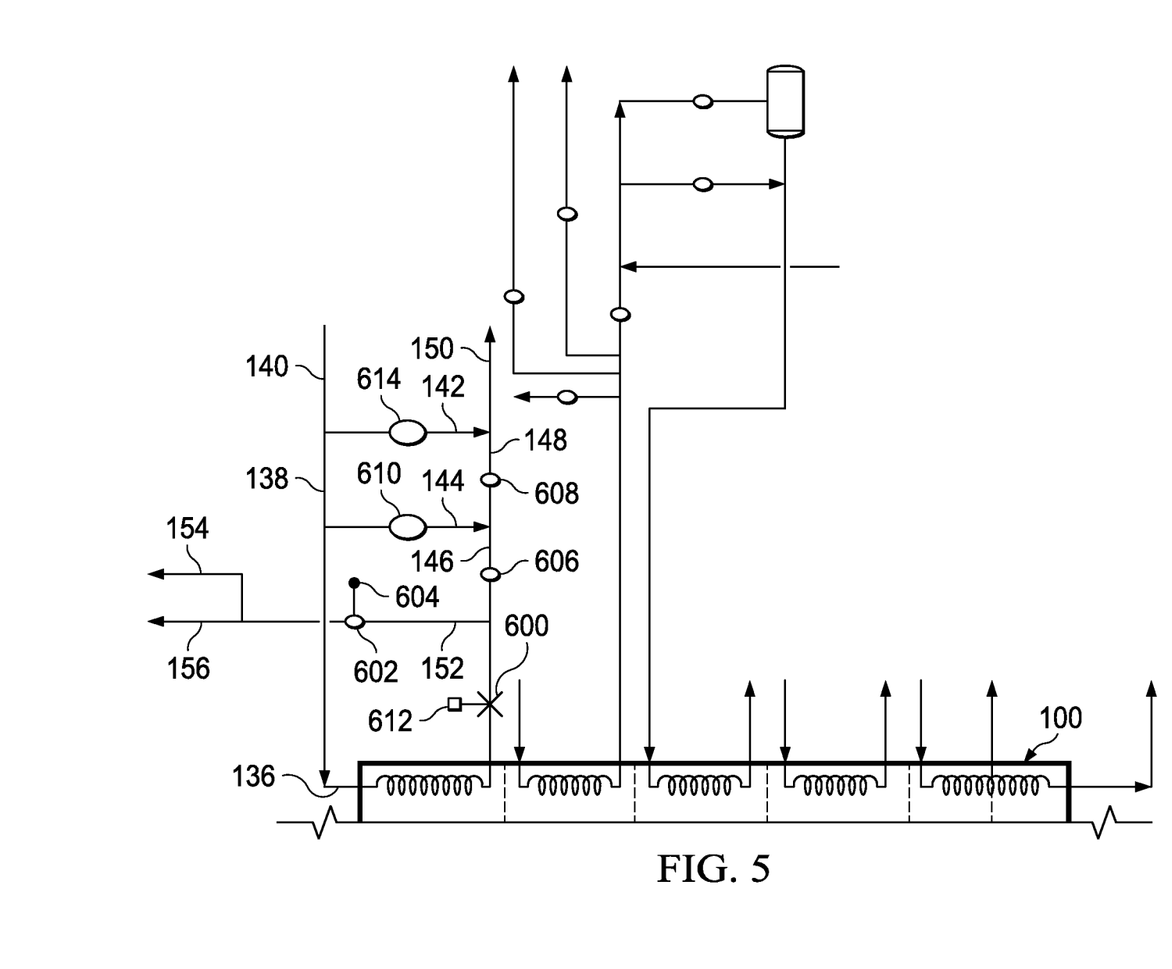
FIG. 5 is a flow sheet for an embodiment of an interlock.

FIG. 5 is a flow sheet for an interlock system on the fourth stage of a propylene refrigeration system. This interlock is design to protect the fourth stage propylene users from low temperature excursion without causing a complete propylene refrigeration shutdown.

Piping for stream 152 includes valve 602. Valve 602 is connected to valve controller 604. Piping for stream 146 includes valve 606. Piping for stream 148 includes valve 608.

Stream 142 flows through aluminum heat exchanger 614. Stream 144 flows through aluminum heat exchanger 610.

Piping for stream 136 includes temperature sensor 600. Temperature sensor 600 determines the temperature of the propylene in stream 136 after it has flowed out of cold box 100. Temperature sensor 600 includes three separate sensors, each of which are determining the temperature of the stream 136 independently. Temperature sensor 600 is connected to interlock 612. The connection allows the temperature readings from temperature sensor 600 to be received by interlock 612.

Interlock 612 is connected to valve controller 604. The connection can be an electrical wire, a data communication line, or a remote communication. The connection allows a signal to be sent from interlock 612 to valve controller 604 which is able to react to the signal. The signal can include but is not limited to the cessation of the flow of electricity or power.

When the temperature of stream 136 is determined to be about −18 F or below by at least two of the three sensors in temperature sensor 600, interlock 612 sends a signal to valve controller 604 to close valve 602. The closure of valve 602 will prevent the flow of liquid propylene with a temperature of about −18 F or below from reaching heat exchangers which are not rated to handle such temperatures through streams 156 and 154.

Valve 606 and valve 608 will remain open and allow the propylene in stream 136 to mix with warmer propylene in streams 144 and 142 before proceeding through the system. The mixture of the warmer propylene will assist in raising the temperature of the propylene to above about −18 F and allow the propylene to continue to flow through the system and prevent a complete system shut down.

Figure 6:
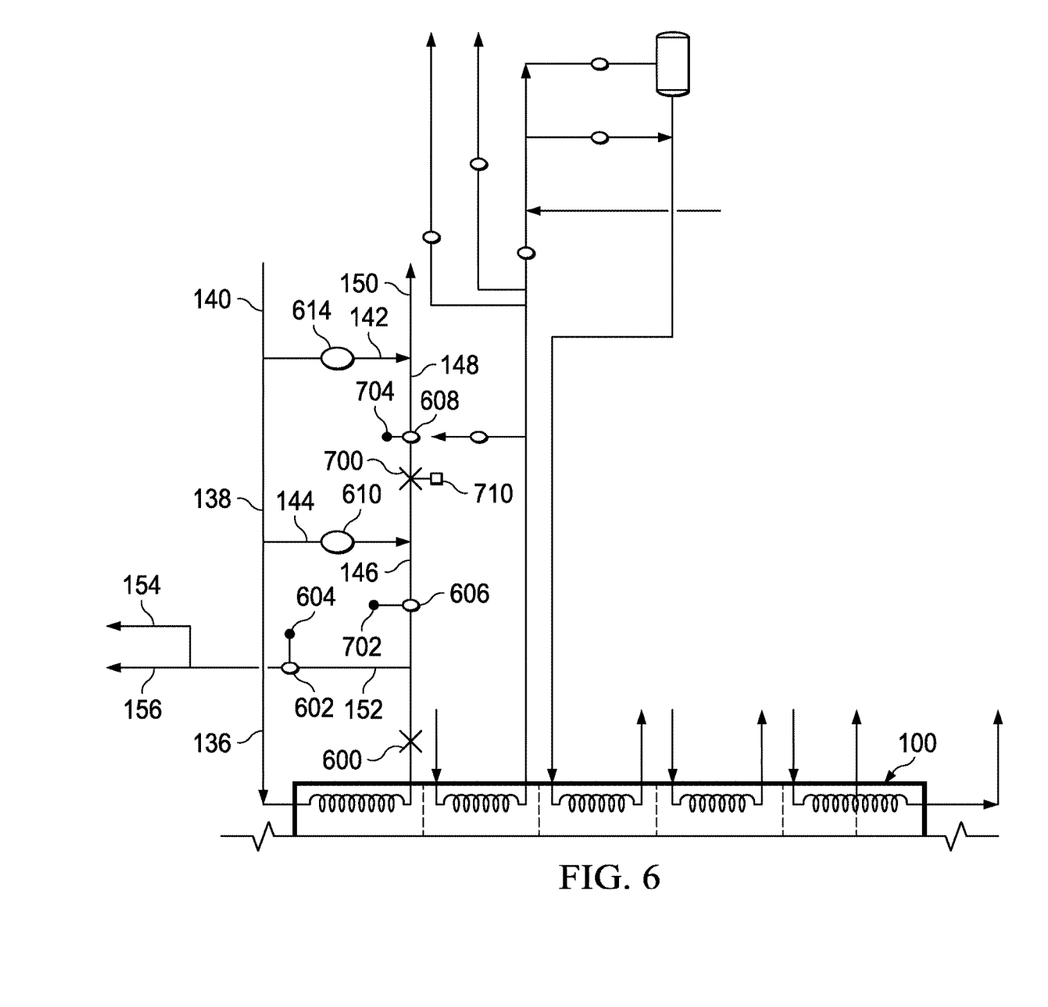
FIG. 6 is a flow sheet for an embodiment of an interlock.

FIG. 6 is a flow sheet for different interlock system on the fourth stage of a propylene refrigeration system. This interlock is design to protect the equipment downstream of stream 150.

Valve 606 is connected to valve controller 702. Valve 608 is connected to valve controller 704.

Piping for stream 148 includes temperature sensor 700. Temperature sensor 700 determines the temperature of propylene through stream 148. Temperature sensor 700 includes three separate sensors, each of which are determining the temperature of the stream 148 independently. Temperature sensor 700 is connected to interlock 710. The connection allows the temperature readings from temperature sensor 700 to be received by interlock 710.

The propylene in stream 148 has proceeded through cold box 100 and mixed with stream 144.

Interlock 710 is connected to valve controllers 702 and 704. The connection can be an electrical wire, a data communication line, or a remote communication. The connection allows a signal to be sent from interlock 710 to valve controllers 702 and 704 which are able to react to the signal. The signal can include but is not limited to the cessation of the flow of electricity or power.

When the temperature of stream 148 is determined to be about −18 F or below by at least two of the three sensors in temperature sensor 700, interlock 710 sends a signal to valve controller 702 and 704 to close valves 606 and 608. The closing of valves 606 and 608 will allow the propylene in stream 140 to bypass cold box 100 and flow into stream 142, through aluminum heat exchanger 614 and into stream 150 where it will continue through the process. The continuing flow of propylene will allow the process to continue operating and prevent a complete system shut down.

Interlock 710 often works in conjunction with the interlock 612. However, interlock 710 is independent of the activation of interlock 612.

In a preferred embodiment, valves 210, 216, 406, 412, 416 and 608 are full port on/off globe valves. However, other types of valves may be used. Other valves described above can include but not limited to gate valves, ball valves, or plug valves. Valves in the preferred embodiment are available from Velan of Montreal, Canada. The actuation systems for valves 210, 216, 406, 412, 416 and 608 are manufactured by either BETTIS of Houston, Tex., or HYDROTORK of Netherlands. The trip solenoids attached to the actuation system are Model Nos. EV8007G1 and 258181-20 manufactured by ASCO of Florham Park, N.J. The purpose of the trip solenoid is to connect each valve with the signal triggered from the described interlocks. Valve positioner connected to each valve Model No. DXP L12GNEB and is supplied by TOPWORX of Louisville, Ky.

In the preferred embodiment, valves 204, 206, 208, 212, 224, 414, 502, 602 and 606 are full port process control valves. The functions of these individual valves can be based on pressure, flow rate, liquid levels, temperature or operators input. Valves and actuation system are available from Emerson Fisher Control Valves of Marshalltown, Iowa. The trip solenoids attached to the actuation system is manufactured by ASCO of Florham Park, N.J. Valve positioner that is installed with the valve actuation system is available from TOPWORX of Louisville, Ky.

In the preferred embodiment, actuation on the valve controllers 214, 220, 222, 226, 228, 408, 410, 506, 604, 702 and 704 are pneumatic controllers which are set to fail closed upon loss of signal. However, other types of valve controllers and actuation, positioning and trip solenoids can be used in the embodiment, as long as the combination of any three valve controllers is able to receive a signal from an interlock and is able to affect the position of the valve in response to the signal including but not limited to electrical, hydraulic, or pneumatic.

In the preferred embodiment, pump 218 is a multi-stage submersible pumps manufactured by Sulzer of Winterthur, Switzerland. The stopping of the pumps can be done by pump controller 230 via distributed control system to the pumps' control system which is connected to the associated interlock. However, other combinations of pumps and pump controllers may be used.

In the preferred embodiment, temperature sensors 200, 400, 500, 600, and 700 are manufactured by Smart Sensors Inc. of Houston, Tex., and have digital displays through the transmitter connected to each sensors manufactured by Rosemount of Chanhassen, Minn. However, other temperature sensors can be used. Further, while in the preferred embodiment temperature sensors 200, 400, 500, 600, and 700 includes three individual sensors.

In the preferred embodiment, the programming of interlocks 201, 420, 510, 612 and 710 are done through the safety instrumented system manufactured by AUGUST SYSTEMS of ABB Group of Zurich, Switzerland or TRICONEX of Invensys of Houston, Tex. However, other safety instrumented system can be used to program the interlock logic as long that they are able to receive temperature readings and transmit a signal to a valve or pump controller for the appropriate response.

In the preferred embodiment, the composition of the streams is the majority component, however, other compounds may be found in the disclosed streams.

In the preferred embodiment, the ethylene production process includes a four stage propylene refrigeration system and an ethylene refrigeration system. However, other heating streams may be used, including a single, double, or triple stage propylene refrigeration system. Further, the ethylene production process may not use an ethylene refrigeration system as a heat stream. Similarly, the ethane and propane streams may flow through the cold box from different stages in the process.

The disclosed embodiment is one illustration of an interlock system with the use in an ethylene production process. A person skilled in the art will understand that other processes with similar temperature operating conditions and concerns can employ the system and method as disclosed. Further, a person skilled in the art will understand that the disclosed streams may flow to other equipment other than the equipment disclosed.

The invention claimed is:

1. A system of a manufacturing process having a cold box, the cold box having a heating stream and a cooling stream, the system comprising:
   a first valve controlling the heating stream;
   a second valve controlling the cooling stream;
   a first controller, operatively connected to the first valve, for activating the first valve when a predetermined temperature occurs;
   a second controller, operatively connected to the second valve, for activating the second valve when the predetermined temperature occurs;
   a first interlock of the cooling stream, the first interlock comprising:
      a temperature sensor of the first interlock;
      a set of valves of the first interlock including the second valve;
      a set of controllers of the first interlock including the second controller;
      each valve of the set of valves of the first interlock connected to a controller of the set of controllers of the first interlock;
      each controller of the set of controllers of the first interlock being programmed to close the valve of the set of valves of the first interlock to which it is connected when the temperature determined by the temperature sensor of the first interlock is at or below the predetermined temperature;
   a second interlock of the heating stream, the second interlock comprising:
      a temperature sensor of the second interlock;
      a set of valves of the second interlock including the first valve;
      a set of controllers of the second interlock including the first controller;
      each valve of the set of valves of the second interlock connected to a controller of the set of controllers of the second interlock; and,
      each controller of the set of controllers of the second interlock being programmed to either open or close the valve of the set of valves of the second interlock to which it is connected when the temperature determined by the temperature sensor of the second interlock is at or below the predetermined temperature; and,
   whereby a cold box shutdown condition is avoided by activation of at least one of the first interlock and the second interlock.

2. The system of claim 1 wherein the heating stream is connected to the cold box by an entrance of the cold box and an exit of the cold box; and,
   the first valve is positioned adjacent the exit.

3. The system of claim 1 wherein the cooling stream is connected to the cold box by an entrance of the cold box and an exit of the cold box; and, p1 the second valve is positioned adjacent the entrance.

4. The system of claim 1 wherein the heating stream has a first stream and a second stream and the first valve controls the first stream of the heating stream, the system further comprising:
- the first controller for closing the first valve;
- the set of valves of the second interlock including a third valve;
- the third valve controlling the second stream of the heating stream;
- the set of controllers of the second interlock including a third controller; and,
- the third controller, operatively connected to the second stream of the heating stream, for opening the third valve when the predetermined temperature occurs.

5. The system of claim 1 wherein the cooling stream has a first stream and a second stream and wherein the second valve controls the first stream of the cooling stream, the system further comprising:
- a pump connected to the second stream of the cooling stream;
- the set of controllers of the first interlock including a third controller; and,
- the third controller, operatively connected to the pump, for deactivating the pump when the predetermined temperature occurs.

6. The system of claim 1 wherein the heating stream has a first stream and a second stream and wherein the first valve controls the first stream of the heating stream, the system further comprising:
- the first controller for closing the first valve;
- the set of valves of the second interlock including a third valve;
- the third valve controlling the second stream of the heating stream;
- the set of controllers of the second interlock including a third controller; and,
- the third controller, operatively connected to the second stream of the heating stream, for closing the third valve when the predetermined temperature occurs.

7. A system of an ethylene manufacturing process having a cold box, the cold box having a heating stream and a cooling stream, the system comprising:
- a first valve controlling the heating stream;
- a second valve controlling the cooling stream;
- a first controller, connected to the first valve, and programmed to activate the first valve when a predetermined temperature occurs;
- a second controller, connected to the second valve, and programmed to activate the second valve when the predetermined temperature occurs;
- a first interlock of the cooling stream, the first interlock comprising:
  - a temperature sensor of the first interlock;
  - a set of valves of the first interlock including the second valve;
  - a set of controllers of the first interlock including the second controller;
  - each valve of the set of valves of the first interlock connected to a controller of the set of controllers of the first interlock;
  - each controller of the set of controllers of the first interlock being programmed to close the valve to which it is connected when the temperature determined by the temperature sensor of the first interlock is at or below the predetermined temperature;
- a second interlock of the heating stream, the second interlock comprising:
  - a temperature sensor of the second interlock;
  - a set of valves of the second interlock including the first valve;
  - a set of controllers of the second interlock including the first controller;
  - each valve of the set of valves of the second interlock connected to a controller of the set of controllers of the second interlock;
  - each controller of the set of controllers of the second interlock being programmed to either open or close the valve to which it is connected when the temperature determined by the temperature sensor of the second interlock is at or below the first predetermined temperature; and,
- whereby a cold box shutdown condition is avoided by activation of at least one of the first interlock and the second interlock.

8. The system of claim 7 wherein the heating stream is connected to the cold box by an entrance of the cold box and an exit of the cold box; and,
the first valve is positioned adjacent the exit.

9. The system of claim 7 wherein the cooling stream is connected to the cold box by an entrance of the cold box and an exit of the cold box; and,
the second valve is positioned adjacent the entrance.

10. The system of claim 7 wherein the heating stream has a first stream and a second stream, and wherein the first valve controls the first stream of the heating stream, the system further comprising:
- the first controller programmed to close the first valve;
- the set of valves of the second interlock having a third valve;
- the third valve controlling the second stream of the heating stream;
- the set of controllers of the second interlock having a third controller; and,
- the third controller, connected to the third valve, and programmed to open the third valve when the predetermined temperature occurs.

11. The system of claim 7 wherein the cooling stream has a first stream and a second stream, the system further comprising:
- a pump connected to the second stream of the cooling stream;
- the first set of controllers of the first interlock including a third controller; and,
- the third controller, connected to the pump, and programmed to deactivate the pump when the predetermined temperature occurs.

12. The system of claim 7, wherein the heating stream has a first stream and a second stream, the first stream of the heating stream is connected to the cold box by a first exit of the cold box and the second stream of the heating stream is connected to the cold box by a second exit of the cold box, further comprising:
- the first valve is positioned adjacent to the first exit;
- a third interlock of the heating stream, the third interlock comprising:
  - a temperature sensor of the third interlock;
  - a set of valves of the third interlock including a third valve;
  - a set of controllers of the third interlock including a third controller;
- the third valve positioned adjacent to the second exit, for controlling the second stream of the heating stream; and, the third controller, connected to the third valve, and programmed to activate the third valve when the predetermined temperature occurs.

13. A system of an ethylene manufacturing process having a cold box, the cold box having a heating stream and a cooling stream, wherein the heating stream has a first stream and a second stream, the first stream of the heating stream connected to the cold box by a first entrance and a first exit, the second stream of the heating stream connected to the cold box by a second entrance and a second exit, the second stream of the heating stream branching into a third stream and a fourth stream after the second exit, and wherein the cooling stream is connected to the cold box by a third entrance and a third exit, the system comprising:
  a first valve controlling the first stream of the heating stream adjacent the first exit;
  a second valve controlling the third stream of the heating stream;
  a third valve controlling the fourth stream of the heating stream;
  a fourth valve controlling the cooling stream adjacent the third entrance;
  a first controller, operatively connected to the first valve, for activating the first valve when a predetermined temperature occurs;
  a second controller, operatively connected to the second valve, for activating the second valve when a the predetermined temperature occurs;
  a third controller, operatively connected to the third valve, for activating the third valve when the predetermined temperature occurs;
  a fourth controller, operatively connected to the fourth valve, for activating the fourth valve when the predetermined temperature occurs;
  a first interlock of the heating stream, the first interlock comprising;
    a temperature sensor of the first interlock;
    a set of valves of the first interlock including the first valve;
    a set of controllers of the first interlock including the first controller;
    each valve of the set of valves of the first interlock connected to a controller of the set of controllers of the first interlock;
    each controller of the set of controllers of the first interlock being programmed to close the valve to which it is connected when the temperature determined by the temperature sensor of the first interlock is at or below the predetermined temperature;
  a second interlock of the heating stream, the second interlock comprising;
    a temperature sensor of the second interlock;
    a set of valves of the second interlock including the second valve and the third valve;
    a set of controllers of the second interlock including the second controller and the third controller;
    each valve of the set of valves of the second interlock connected to a controller of the set of controllers of the second interlock;
    each controller of the set of controllers of the second interlock programmed to either open or close the valve to which it is connected when the temperature determined by the temperature sensor of the second interlock is at or below the predetermined temperature;
  a third interlock of the cooling stream, the third interlock comprising;
    a temperature sensor of the third interlock;
    a set of valves of the third interlock including the fourth valve;
    a set of controllers of the third interlock including the fourth controller;
    each valve of the set of valves of the third interlock connected to a controller of the set of controllers of the third interlock;
    each controller of the third set of controllers being programmed to close the valve to which it is connected when the temperature determined by the temperature sensor of the third interlock is at or below the predetermined temperature; and,
  whereby a cold box shutdown condition is avoided by at least one of the activation of the first interlock, the activation of the second interlock, and the activation of the third interlock.

14. The system of claim 13 further comprising:
  the second controller of the set of controllers of the second interlock for closing the second valve of the set of valves of the second interlock; and,
  the third controller of the set of controllers of the second interlock for opening the third valve of the set of valves of the second interlock.

15. The system of claim 13 further comprising:
  the cooling stream having a first stream and a second stream;
  a pump operatively positioned in the second stream of the cooling stream;
  the set of controllers of the third interlock including a fifth controller; and,
  the fifth controller, connected to the pump, for deactivating the pump when the predetermined temperature occurs.

16. The system of claim 13 further comprising:
  the first controller for activating the first valve when the predetermined temperature occurs adjacent the first exit;
  the second controller for activating the second valve when the predetermined temperature occurs adjacent the second exit; and,
  the fourth controller for activating the fourth valve when the predetermined temperature occurs at the third exit.

17. The system of claim 16 wherein the cooling stream has a first stream and a second stream and wherein the fourth valve controls the first stream of the cooling stream, the system further comprising;
  a pump connected to the second stream of the cooling stream;
  the set of controllers of the third interlock including a fifth controller; and,
  the fifth controller for deactivating the pump when the predetermined temperature occurs at the third exit.

18. The system of claim 5 further comprising:
  a third interlock of the heating stream, the third interlock comprising:
    a temperature sensor of the third interlock;
    a set of valves of the third interlock including a third valve and a fourth valve;
    a set of controllers of the third interlock including a fourth controller and a fifth controller;
    the third valve connected to the fourth controller;
    the fourth valve connected to the fifth controller;
    the fourth controller programmed to close the third valve when the temperature determined by the temperature sensor of the third interlock is at or below the predetermined temperature;

the fifth controller programmed to open the fourth valve when the temperature determined by the temperature sensor of the third interlock is at or below the predetermined temperature;

a fourth interlock of the heating stream, the fourth interlock comprising:
- a temperature sensor of the fourth interlock;
- a fifth valve;
- a sixth controller that is connected to the fifth valve;
- the sixth controller programmed to close the fifth valve when the temperature determined by the temperature sensor of the fourth interlock is at or below the predetermined temperature;

a fifth interlock of the heating stream, the fifth interlock comprising:
- a temperature sensor of the fifth interlock;
- a set of valves of the fifth interlock including a sixth valve and a seventh valve;
- a set of controllers of the fifth interlock including a seventh controller and an eighth controller;
- the sixth valve connected to the seventh controller;
- the seventh valve connected to the eighth controller;
- the seventh controller programmed to close the sixth valve when the temperature determined by the temperature sensor of the fifth interlock is at or below the predetermined temperature;
- the eighth controller programmed to close the seventh valve when the temperature determined by the temperature sensor of the fifth interlock is at or below the predetermined temperature;

wherein streams of the set of valves of the first interlock flow into a first entrance of the cold box through the first stream of the cooling stream;

wherein the second stream of the cooling stream flows through the pump and flows into a second entrance of the cold box;

wherein the heating stream flows from a first exit of the cold box and a second exit of a cold box, the heating stream from the first exit splits into a first stream and a second stream, and the heating stream from the second exit splits into a third stream and a fourth stream, and wherein the heating stream from the second exit has a bypass stream;

wherein the fifth valves controls the first stream of the heating stream and the set of valves of the fifth interlock controls the second stream of the heating stream;

wherein the set of valves of the second interlock controls the third stream of the heating stream and the set of valves of the third interlock controls the fourth stream of the heating stream and the bypass stream;

wherein the predetermined temperature is about −18 degrees Fahrenheit; and, whereby a cold box shutdown is avoided by activation of at least one of the third interlock, the fourth interlock, and the fifth interlock.

* * * * *